US007133161B2

(12) United States Patent
Xu et al.

(10) Patent No.: US 7,133,161 B2
(45) Date of Patent: Nov. 7, 2006

(54) REHALFTONING OF GRAY HALFTONES WITH OPTIMAL SCREEN FREQUENCY FOR ROBUST SUPPRESSION OF MOIRÉ

(75) Inventors: Beilei Xu, Penfield, NY (US); Robert Paul Loce, Webster, NY (US)

(73) Assignee: Xerox Corporation, Stamford, CT (US)

( * ) Notice: Subject to any disclaimer, the term of this patent is extended or adjusted under 35 U.S.C. 154(b) by 1011 days.

(21) Appl. No.: 10/153,355

(22) Filed: May 22, 2002

(65) Prior Publication Data

US 2003/0218779 A1  Nov. 27, 2003

(51) Int. Cl.
*H04N 1/405* (2006.01)

(52) U.S. Cl. ..................... 358/3.26; 358/3.07

(58) Field of Classification Search ...... 358/3.06–3.08, 358/3.26, 1.9, 3.13–3.14; 382/237
See application file for complete search history.

(56) References Cited

U.S. PATENT DOCUMENTS

| | | | |
|---|---|---|---|
| 4,194,221 A | 3/1980 | Stoffel | |
| 4,811,115 A | 3/1989 | Lin et al. | |
| 4,941,185 A | 7/1990 | Reed | |
| 5,293,430 A | 3/1994 | Shiau et al. | |
| 5,341,226 A | 8/1994 | Shiau | |
| 6,185,328 B1 | 2/2001 | Shiau | |
| 6,347,153 B1 | 2/2002 | Triplett et al. | |
| 6,549,656 B1 * | 4/2003 | Lin | 382/173 |

FOREIGN PATENT DOCUMENTS

WO  WO 98/36555  8/1998

OTHER PUBLICATIONS

D. Blatner, G. Fleishman and S. Roth, *Real World Scanning and Halftones*, 2nd Edition, 1988, p. 280.

Xiangdong Liu, Roger Ehrich, "Analysis of Moire Patterns in Non-Uniformly Sampled Halftones", *Applications of Computer Vision*, 1996. WACV '96, Proceedings 3rd IEEE Workshop on Sarasota, Fl., USA Dec. 2-4, 1996, Los Alamitos, Ca, USA, IEEE Comput. Soc, US Dec. 2, 1996, pp. 208-213.

Joseph Shou-Pyng Shu, Robert Springer, Chia Lung Yeh, "Moire Factors and Visibility in Scanned and Printed Halftone Images", *Optical Engineering*, Soc. of Photo-Optical Instrumentation Engineers, Bellingham, US, vol. 28, No. 7, Jul. 1, 1989, pp. 805-812.

Dimitri Van De Ville, Koen Denecker, Wilfried Philips, Ignace Lemahieu, "Nonlinear Resampling for Edge Preserving Moire Suppression", *Journal of Electronic Imaging*, SPIE and IS&T, US, Oct. 2000, vol. 9, No. 4, pp. 534-547.

(Continued)

*Primary Examiner*—Thomas D. Lee
*Assistant Examiner*—Stephen Brinich
(74) *Attorney, Agent, or Firm*—Fay, Sharpe, Fagan, Minnich & McKee, LLP (57) ABSTRACT

Optimal rehalftone screen frequencies are found by searching frequency space for points that are maximally spaced from significant frequency components of an input image halftone screen or screens. Selecting a rehalftone screen having a maximally spaced frequency produces moiré of the highest frequency possible. High frequency moiré are visually unobjectionable. Optimal rehalftone frequencies may be found near the maximally spaced points where system or other constraints limit the usefulness of the maximally spaced points. Rehalftone screen frequencies in the range of about 1.4 to about 1.8 times the fundamental frequency of the input image halftone screen are often optimal. A rehalftone screen frequency of 1.5 times the fundamental frequency of the input image halftone screen is often optimal when the input image is monochrome and uses a dot screen.

25 Claims, 9 Drawing Sheets

OTHER PUBLICATIONS

Arden Steinbach, K. Y. Wong, "An Understanding of Moire Patterns in the Reproduction of Halftone Images", Computer Society Conference on Pattern Recognition and Image Processing, Chicago, U.S., Aug. 6-8, 1979, New York, IEEE, US, vol. Proc. 1979, pp. 545-552.

Thomas Scheermesser, Frank Wyrowski, Olof Bryngdahl, "Digital Halftoning Using Two-Dimensional Carriers with a Noninteger Period", *Journal of Electronic Imaging*, SPIE and IS&T, U.S. Jan. 1995, vol. 4, No. 1, pp. 40-47.

* cited by examiner

's screen frequency and the output frequency (1:1, 2:1, etc.)." However, if the rehalftone screen frequency is not an exact integral of the original's screen frequency, or if the screen angles don't exactly match, objectionable, low frequency moiré are likely to be produced.
REHALFTONING OF GRAY HALFTONES WITH OPTIMAL SCREEN FREQUENCY FOR ROBUST SUPPRESSION OF MOIRÉ

BACKGROUND OF THE INVENTION

The invention is related to the art of rendering images. The invention is applicable where, for example, descreened halftone or gray halftone images are to be rehalftoned. The invention will be described in relation to a xerographic environment. However, those of skill in the art will understand that the invention can be applied in other digital imaging applications. For example, the invention can be applied in lithographic, ionographic and ink jet environments.

Many gray halftone images must be transformed to binary form in order to provide signals that can drive an imager. For example, when a halftone image is scanned by a photocopier, the scanning process creates a gray halftoned version of the image. Most rendering devices are binary in nature. Therefore, the gray halftoned version of the image must be rehalftoned before a copy of the image can be made by a rendering device, such as, for example, a xerographic print engine. Other sources of gray halftone images include, but are not limited to, JPEG uncompressed halftone images and multi-level halftoned images.

A problem associated with rendering such rehalftoned images is the creation of moiré due to the beating of frequency components in a rehalftoning screen with frequency components in the original halftone screens. Therefore, one approach to rendering images that must be rehalftoned is to first descreen the image and then rehalftone. The descreening process tends to filter or average out the original halftone screen. However, descreening is not always desirable. For instance, descreening can introduce an undesirable blur into an image. Furthermore, descreening does not always completely eliminate the original halftone pattern. Therefore, a residual halftone screen component can remain in the image and rehalftoning can yield objectionable moiré.

Another approach is to simply rehalftone the gray halftoned image. As explained by David Blatner, Glen Fleischman, and Steve Roth in their book *Real World Scanning and Halftones*, Peach Pit Press, 1998, page 280, in simply rehalftoning the gray halftoned image, "the idea is to have an integral relationship between the original's screen frequency and the output frequency (1:1, 2:1, etc.)." However, if the rehalftone screen frequency is not an exact integral of the original's screen frequency, or if the screen angles don't exactly match, objectionable, low frequency moiré are likely to be produced.

Other approaches, such as, stochastic screening and error diffusion, often yield fragmented halftone dots that appear noisy and have high dot gain. Fragmented dots also do not render colors and gray tones as consistently as when the dots are clustered. Clustered dots tend to yield prints that are more consistent in color across a page and from print to print.

Rehalftoning at integrals of the original halftone screen frequency is suggested so all strong beats between the rehalftone screen and the original screen will occur at zero frequency. This strategy works well for applications where all screen frequencies and screen angles are known exactly and are achievable. However, this strategy is very poor if there is some uncertainty or inability to exactly achieve the required screen frequencies and angles. A small deviation in either screen frequency or angle from an exact integer multiple of an original screen frequency is likely to yield objectionable, low frequency moiré.

Unfortunately, in many rehalftoning applications, the exact frequency and angle of an original halftone screen is unavailable. For example, in a photocopying environment where a user simply places an image on a scanner and requests that copies be made, information is usually unavailable as to how the image was originally halftoned. Additionally, the angle at which the image is placed on the scanner may also be unknown. In addition, paper shrinkage occurs in many printing processes and often the shrinkage varies across a sheet of paper. Knowledge of the exact original halftone frequency does not fully describe the complicated frequency content that can occur on a scanned page. Therefore, selecting a rehalftone screen that meets the criteria of integral multiples of original screen frequency can be problematic.

Therefore, there is desire to provide a method for rendering descreened and gray halftone images that does not introduce objectionable moiré and does not produce significant dot fragmentation.

SUMMARY OF THE INVENTION

A method of rendering an image based on an original halftone image includes determining a frequency of a significant frequency component of the original halftone image, selecting a rehalftone frequency, based on the frequency of the significant frequency component, the selection being directed toward producing moiré of unobjectionably high frequency, rehalftoning the original halftone image at the selected rehalftone frequency and, rendering the image based on the rehalftoning.

For example, determining a halftone frequency can comprise segmenting and classifying the image based on the segmentation, extracting the information from a tag associated with the image, or receiving screen frequency information from a system operator.

Rendering the image can include using a xerographic print engine to print the image. Other rendering devices can also be used. For example, lithographic and ink jet print engines can be used to render the image.

Selecting the rehalftone frequency can include searching frequency space by minimizing a function of distances between candidate rehalftone frequency points and frequency components of interest and, selecting a rehalftone frequency from within a region of frequency space near a local minimum of the function of distances.

Some embodiments of the invention include determining a halftone frequency of the original halftone image, selecting a rehalftone frequency to be approximately 1.4 to 1.8 or 2.4 to 2.8 times the original halftone frequency, rehalftoning the original image at the selected rehalftone frequency, and rendering the image based on the rehalftoning, thereby ensuring that no visually objectionable moiré occur.

Some embodiments include selecting a rehalftone frequency to be about 1.5 times the fundamental frequency of a halftone screen of an input image. Other embodiments include selecting a rehalftone frequency to be about 1.64 or about 2.5 times the fundamental frequency of a halftone screen of an input image.

A system operative to render an image based on an original halftone image includes a halftone frequency classifier, a screen selector, a rehalftoner, and a rendering device. The halftone frequency classifier is operative to determine a significant frequency component of the original halftone image. The screen selector is operative to select a rehalftone screen having a rehalftone frequency based on the significant frequency component. The selection is directed toward producing moiré of unobjectionably high frequency. The rehalftoner is operative to rehalftone the original halftone image with the selected rehalftone screen. A rendering device is operative to render the image.

For example, the rendering device is a xerographic print engine. Alternatively, the rendering device can be a lithographic print engine or an ink jet print engine.

BRIEF DESCRIPTION OF THE DRAWINGS

The invention may take form in various components and arrangements of components, and in various procedures and arrangements of procedures. The drawings are only for purposes of illustrating a preferred embodiment(s) and not to be construed as limiting the invention. Further, it is to be appreciated that the drawings are not to scale.

DETAILED DESCRIPTION OF THE INVENTION

It should be noted that phrases such as first harmonic, second harmonic and third harmonic are often used to refer to the order of a harmonic. That is to say, a first order harmonic is a harmonic having a frequency closest to a fundamental frequency; a second order harmonic is a harmonic having a frequency second closest to the fundamental; a third order harmonic is a harmonic having a frequency second closest to the fundamental, and so on.

In the following discussion, phrases such as first harmonic, second harmonic, and third harmonic are not used to refer to the order of the harmonic. Instead the labels such as, first, second and third, are used merely to distinguish one frequency component from another.

As explained above, existing methods for combating moiré in rehalftoning applications have been directed toward attempts to achieve zero frequency moiré. Such methods are extremely sensitive to error. For example, where a rehalftoning screen is selected, that has a fundamental frequency that is just 1 cycle per inch (cpi) different than the fundamental of an original or input halftone screen of the original or input image, a moiré will occur at 1 cpi and, therefore, be quite objectionable. Furthermore, where a screen angle of a rehalftone screen differs from a screen angle of an original input screen of similar frequency, objectionable moiré are produced.

The method of rendering images disclosed here recognizes that it is very difficult to achieve zero moiré frequency. Therefore, the present method is directed toward shifting moiré energy toward frequencies above a threshold of visual perceptibility. For instance, objectionable moiré are avoided by selecting a rehalftone screen that has frequency components optimally or maximally spaced from frequency components of an input image screen. This maximal or optimal spacing yields moiré of the highest possible or practical frequency. For example, where a black and white input image includes an input image halftone screen of a frequency f and a significant harmonic at a frequency of 2f, selecting a rehalftone screen with a fundamental frequency of 1.5f maximally spaces the frequency components of the rehalftone screen from those frequency components of the input screen. In this example, moiré will occur with a frequency of 0.5 of the fundamental frequency of the input screen. For most input screens, the moiré occur above the visual perception threshold. Even where input screens are of relatively low frequency, with this approach, moiré occur at unobjectionably high frequencies.

Instead of rehalftoning with a frequency that attempts to achieve the nearly impossible singularity of zero frequency moiré, the present method chooses a rehalftone screen that produces moiré patterns at very high frequencies where they possess minimal visibility. The method is robust against small errors in angle and frequency because such errors are manifest as slight shifts from the target high frequency moiré and still result in unobjectionable high frequency moiré.

As described above, in some embodiments, high moiré frequencies are achieved by selecting a rehalftone screen having a screen frequency that is 1.5× the screen frequency of the original halftone image. Preferably, the selected rehalftone screen has the same screen angle as the original halftone screen. As will be illustrated in more detail below, selecting a rehalftone screen with a fundamental frequency that is approximately 1.5× the fundamental frequency of the input halftone screen produces not only high frequency beats between the fundamentals of the original input screen and the rehalftone screen, but also produces high frequency beats between the various harmonics of the input screen and the rehalftone screen.

For example, the table below lists, in general terms, important beat frequencies between an input screen and a rehalftone screen where the rehalftone screen is selected to be at the same angle as the input halftone screen and to have a fundamental frequency of approximately 1.5× the fundamental frequency of the input screen. The table shows that all strong beats occur at a frequency that is 50 percent that of the input halftone screen frequency or higher. For commonly used screens (e.g., fundamental frequency=110 cpi, 141 cpi, 170 cpi and 212 cpi), the table shows that moiré patterns will have frequencies that are 55 cpi or higher. Moiré frequencies of about 40 to 55 cpi and higher are usually considered to be unobjectionable. Any slight error in the selection of the rehalftone screen will produce slight errors from the figures in the table. However, a slight error from a high frequency moiré is still a high frequency moiré. Therefore, even when the rehalftone screen has a fundamental frequency that is only approximately 1.5× that of the input screen, only moiré with unobjectionably high frequencies are produced.

|  | Fundamental of rehalftone | $1^{st}$ - order harmonic of rehalftone | $2^{nd}$ - order harmonic of rehalftone |
| --- | --- | --- | --- |
| Fundamental of input | 0.5 f | >0.5 f | 2 f |
| $1^{st}$ - order harmonic of input | >0.5 f | 0.5 f | >0.5 f |
| $2^{nd}$ - order harmonic of input | 0.5 f | >0.5 f | f |

In order to select a rehalftone screen maximally spaced from strong frequency components of an input halftone screen, some measure of the input halftone screen must be available. Input screen information can be determined automatically, for example, through image segmentation and classification techniques. Alternatively, the information can be entered by an image processing system operator. In still other applications, such as, for example, multi-level halftoning, exact input screen information is known. Preferably, input halftone screen frequency information is included in a tag. The tag travels along an image path in association with the image to be used by image processing devices in selecting a rehalftone screen.

FIG. 1-FIG. 9 provide a simple monotone or black and white input image example to illustrate that the method described here yields only the highest frequency moiré possible or practical. FIG. 1-FIG. 10 are qualitative moiré frequency analysis vector diagrams. FIG. 10 diagrams a color example. The figures are plots in a Cartesian frequency space. The abscissa of the plots represents frequency components in a horizontal direction. The ordinate of the plots represents frequency components in a vertical direction. Horizontal and vertical refer to directions in an image, for example, directions on printed page. The length of a vector in such a frequency space represents a frequency of a frequency component of a halftone screen. The direction or angle of a vector in such a frequency space represents the direction or angle of orientation of the frequency component.

For example, a dot screen can be comprised of halftone cells arranged in a checkerboard pattern of rows and columns. The frequency with which the rows and columns occur in the screen (rows per inch, columns per inch) and the orientation of those rows and columns is encoded in the length and angle of orientation of fundamental frequency vectors in such diagrams. Four fundamental frequency vectors represent such a dot screen. Rows extend, for example, in right and left directions and columns extend, for example an upward and downward direction. Each direction is represented by a vector in the above described frequency space. First order harmonics of the fundamental frequency components result from the beating of the fundamental frequency components. Higher order harmonics result from beats between the fundamental components and harmonic components and beats of harmonics with each other. When screens are combined, due to, for example rehaftoning, additional beats occur. These beats result in moiré. If the dot screen is oriented at an angle then the direction of the vectors are rotated accordingly.

Figure 1:
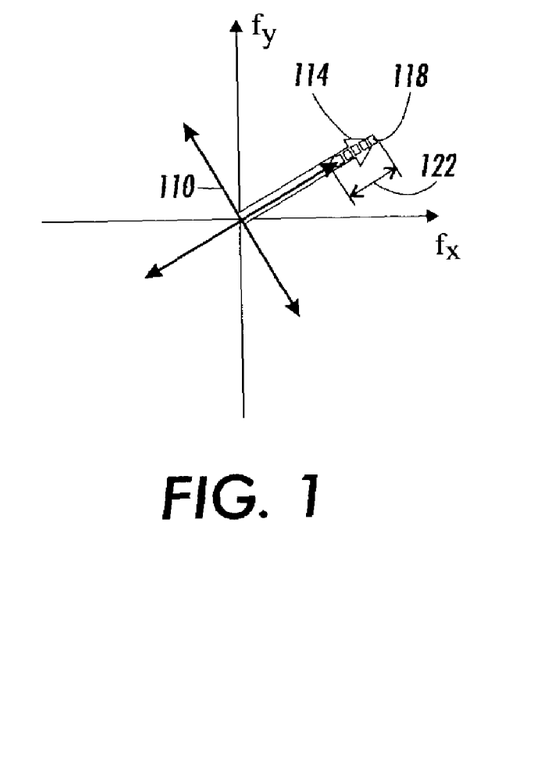
FIG. 1 is a qualitative moiré analysis vector diagram showing a beat between fundamental components of an input and a rehalftone screen where the fundamental frequency of the rehalftone screen is 1.5× the fundamental frequency of the original input screen and at the same angle as the original input screen.

For example, referring to FIG. 1, when a 30 degree dot screen (a dot screen oriented at 30 degrees to the horizontal), represented by four fundamental frequency vectors 110 of a black and white or monotone original or input image, beat with a 30 degree rehalftone screen (represented by one fundamental frequency vector 114 for simplicity and clarity), that is at a frequency 1.5× the frequency of the input screen, moiré (represented by one fundamental frequency vector 118 for simplicity and clarity) are created that have a frequency 122 of 0.5 (or fifty percent) that of the input screen fundamental. As explained above, moiré of this frequency are often unobjectionable Referring to FIG. 2, a first harmonic 214 of the rehalftone screen 114 beats with the fundamental of the input screen 110 to produce a second moiré 218. The second moiré 218 are at a second frequency 222 that is higher than fifty percent of the fundamental frequency of the input screen 110.

Figure 3:
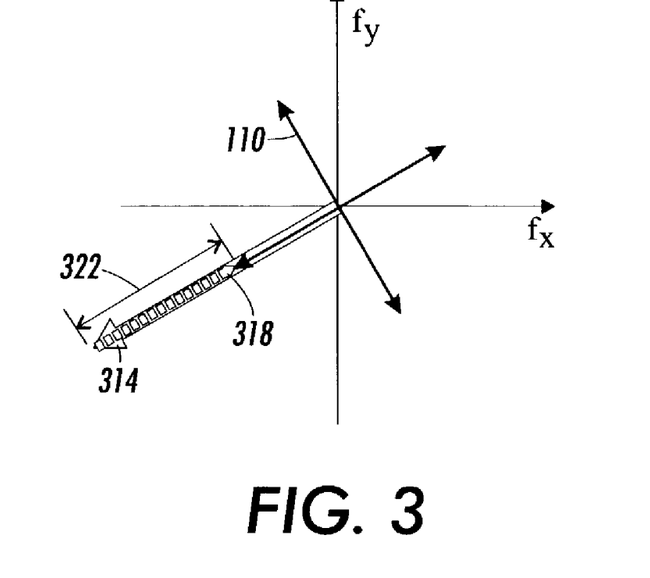
FIG. 3 is a qualitative moiré analysis vector diagram showing a beat between the fundamental of the input screen of FIG. 1 and a second harmonic of the rehalftone screen of FIG. 1.

Referring to FIG. 3, a second harmonic 314 of the rehalftone screen 114 beats with the fundamental frequency 110 of the input halftone screen to create a moiré 318. The moiré 318 has a frequency 322 higher than fifty percent of the fundamental frequency of the input screen 110.

Figure 4:
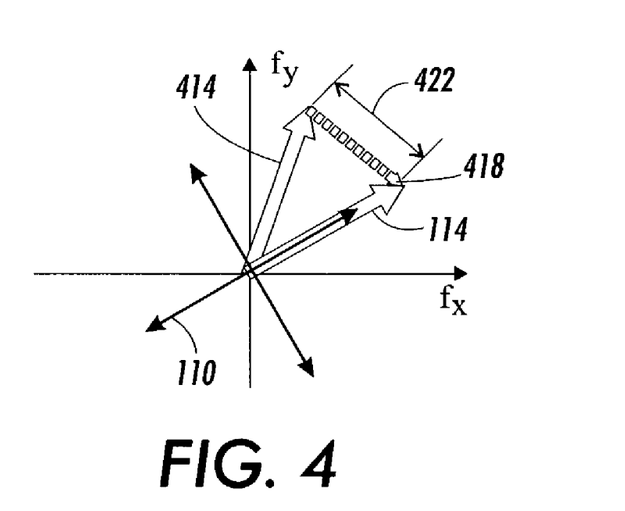
FIG. 4 is a qualitative moiré analysis vector diagram showing a beat between a first harmonic of the input screen of FIG. 1 and the fundamental of the rehalftone screen of FIG. 1.

Referring to FIG. 4, a first harmonic 414 of the input screen fundamental 110 beats with the fundamental of the rehalftone screen 114 to produce a fourth moiré 418. The fourth moiré 418 has a frequency 422 that is higher than fifty percent of the fundamental frequency of the input screen 110.

Figure 5:
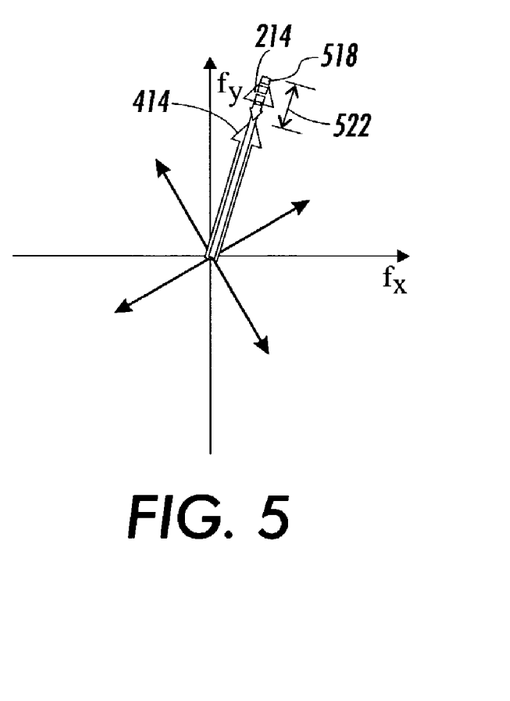
FIG. 5 is a qualitative moiré analysis vector diagram showing a beat between a first harmonic of the input screen of FIG. 1 and the first harmonic of the rehalftone screen of FIG. 1.

Referring to FIG. 5, the first harmonic 214 of the rehalftone screen 114 beats with the first harmonic 414 of the input screen to produce a sixth moiré 518. The sixth moiré 518 has a frequency 522 of fifty percent of the input screen fundamental.

Figure 6:
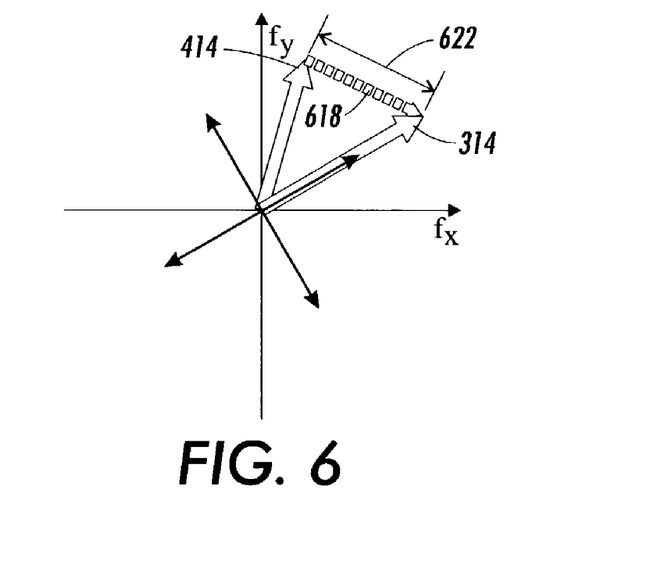
FIG. 6 is a qualitative moiré analysis vector diagram showing a beat between the first harmonic of the input screen of FIG. 1 and a second harmonic of the rehalftone screen of FIG. 1.

Referring to FIG. 6, the second harmonic 314 of the rehalftone screen 114 beats with the first harmonic 414 of the input screen to produce seventh moiré 618. The seventh moiré 618 has a frequency 622 that is higher than fifty percent of the fundamental frequency of the input screen 110.

Figure 7:
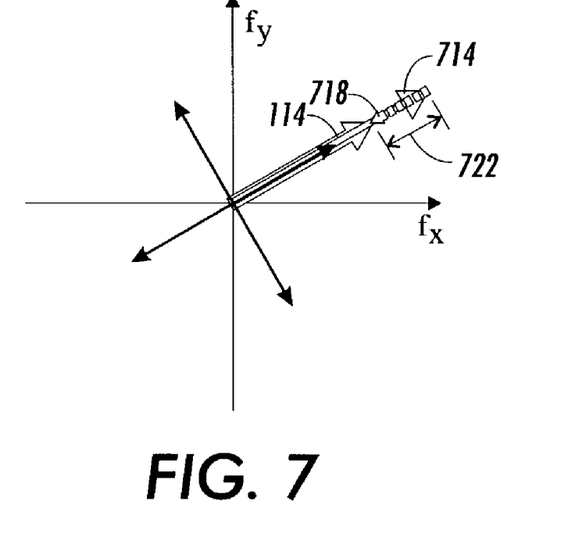
FIG. 7 is a qualitative moiré analysis vector diagram showing a beat between the second harmonic of the input screen and the fundamental of the rehalftone screen of FIG. 1.

Referring to FIG. 7, a second harmonic 714 of the input screen beats with the fundamental 114 of the rehalftone screen to produce an eighth moiré 718. The eighth moiré 718 has a frequency 722 that is fifty percent of the fundamental frequency of the input screen 110.

Figure 8:
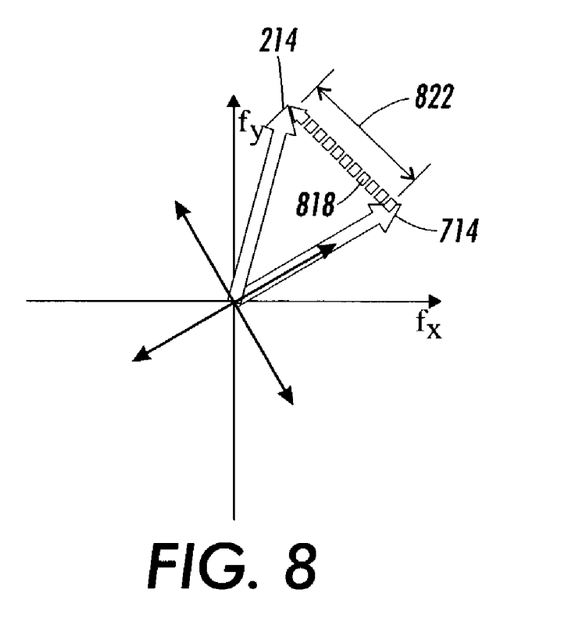
FIG. 8 is a qualitative moiré analysis vector diagram showing a beat between the second order harmonic of the input screen and the first harmonic of the rehalftone screen of FIG. 1.

Referring to FIG. 8, the first harmonic 214 of the rehalftone screen 114 beats with the second harmonic 714 of the input screen to produce a ninth moiré 818. The ninth moiré 818 has a frequency 822 that is higher than fifty percent of the fundamental frequency of the input screen 110.

Figure 9:
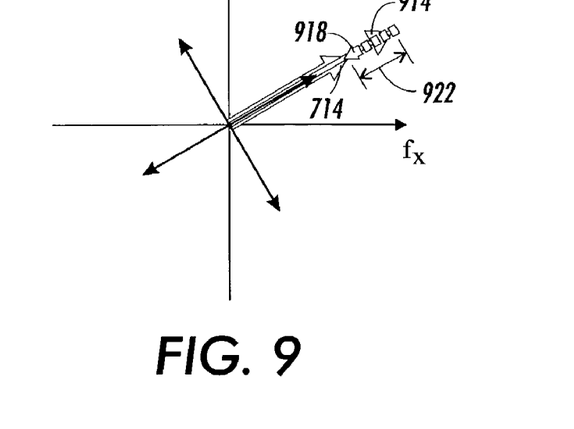
FIG. 9 is a qualitative moiré frequency analysis vector diagram showing a beat between the second harmonic of the input screen and the second order harmonic of the rehalftone screen of FIG. 1.
Figure 10:
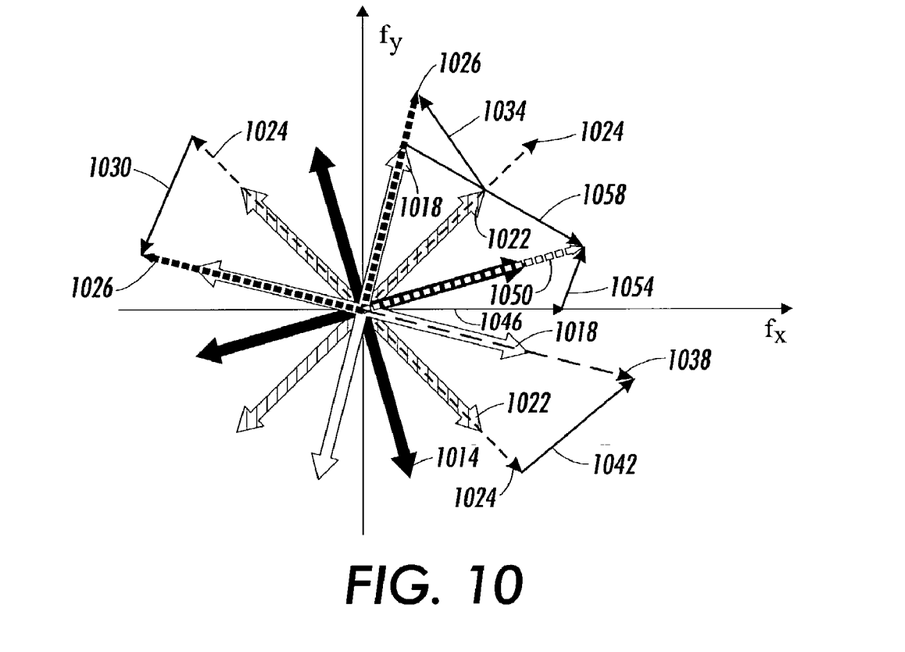
FIG. 10 is a qualitative moiré analysis vector diagram of a color image and rehalftone screen. The diagram shows beatings among three input screens and rehalftone screens where the rehalftone screens have been selected to be of a frequency that is 1.5× the fundamental frequency of the input screens.

Referring to FIG. 9, the second harmonic 714 of the input screen beats with a second harmonic 914 of the rehalftone screen to produce a tenth moiré 918. The ten moiré 918 has a frequency 922 that is higher than fifty percent of the fundamental frequency of the input screen 110.

In the case of the 30-degree dot screen illustrated in FIG. 1 through FIG. 9, selecting a rehalftone screen at the same angle and 1.5× the frequency of the input halftone screen selects a rehalftone screen that is maximally or optimally spaced in the frequency domain from significant frequency components of the input halftone screen. For example, selecting the rehalftone screen 114 to have a frequency of 1.5× that of the input halftone screen fundamental 110 places the rehalftone screen 114 maximally spaced from the input screen fundamental 110 and the second harmonic 714 of the input screen.

In some applications, it may be desirable to select a rehalftone screen that is maximally spaced from other frequency components of the input screen. For example, it may be desirable to select a rehalftone screen that is maximally spaced from the input screen fundamental and the first harmonic 414 of the input screen. In that case, the rehalftone screen may be selected to have an angle that is one half the angle between the input screen fundamental and the first harmonic 414. The frequency of the rehalftone screen would be selected so that any moiré that are produced would be of a frequency above a threshold related to visual perceptibility. In other instances, it may be desirable to select a halftone that is optimally or maximally spaced from the second harmonic 714 of the input screen and, for example, a third harmonic of the input halftone screen. For example, the third harmonic might have a frequency of 3×. Selecting a rehalftone screen that is maximally spaced between the second harmonic 714 and the third harmonic could include, for example selecting a rehalftone screen having a fundamental frequency of 2.5 that of the input halftone screen.

For example, some older printing devices use halftone screens having a fundamental halftone frequency of 85 cpi. If an image from such a printing device was to be rehalftoned the distance maximization technique described above can be beneficially applied. However, the techniques should be used to yield moiré over some visually unobjectionable frequency threshold (e.g. 50 cpi). In this case an optimum halftone frequency would be between two harmonics that are in-line with or at the same angle as the fundamental frequency. When the input halftone fundamental frequency is 85 cpi, the 1.5× strategy leads to a relatively low frequency beat (42.5 cpi). In that case it may be desirable to use 2.5× the frequency of the fundamental of the input screen (212.5 cpi) as the rehalftone frequency. At this frequency, the strongest beats will be between the rehalftone fundamental frequency and nearby (in frequency space) higher order harmonics of the input halftone. These beats will still be of relatively low frequency. However, high order harmonics have relatively low amplitudes. Therefore, moiré produced by beats with high order harmonics produce low amplitude, and therefore unobjectionable moiré.

However, selecting a rehalftone screen at the same angle and having a fundamental frequency 1.5× that of the input screen, as illustrated in the monochrome examples of FIG. 1-FIG. 9, is preferable in many instances.

Referring to FIG. 10, where a color image includes frequency components of cyan 1014, magenta 1018 and black 1022 dot screens that are oriented 30 degrees apart, selecting a set of rehalftone screens (1024, 1026, 1050) for maximal or optimal separation, that have a fundamental frequencies that are 1.5× that of the respective fundamental screens (black 1022, magenta 1018, cyan 1014), not only produces high-frequency moiré with the frequency components of respective input screens, as explained with reference to FIG. 1 through FIG. 9 above, but each rehalftone screen also produces high-frequency moiré with respect to the frequency components of the other screens of the image.

For example, the fundamental of the black rehalftone screen 1024 beats with the fundamental of a magenta rehalftone screen 1026 to produce a first moiré 1030 having a frequency above fifty percent of the fundamentals of the input screens (1014, 1018, 1022). The black input fundamental 1022 beats with the fundamental 1026 of the magenta rehalftone screen to create a second moiré 1034 that has a frequency greater than fifty percent of the fundamental of the input screens (1014, 1018, 1022). A harmonic 1038 of the magenta input screen beats with the fundamental 1024 of the black rehalftone screen to produce a third moiré 1042 with a frequency higher than fifty percent of the fundamental frequency of the input screens. A harmonic 1046 of the black input screen beats with the fundamental 1050 of a cyan rehalftone screen to produce a fourth moiré 1054 having a frequency of 0.39 of the fundamental of the input screens. The fundamental 1018 of the magenta input screen beats with the fundamental 1050 of the cyan rehalftone screen to produce a fifth moiré 1058 having a frequency higher than fifty percent of the fundamental of the input screens (1014, 1018, 1022).

Those of skill in the art will understand that the moiré illustrated in FIG. 10 are examples of the lowest frequency moiré produced in rehalftoning an image with the three input screens and rehalftone screens optimally spaced between significant frequency components of the input screens. As is illustrated in FIG. 1 through FIG. 9, higher frequency harmonics of the various screens will combine to generate moiré at higher frequencies than the moiré shown in FIG. 10.

While this exemplary application of rehalftone frequencies and angles selection based on optimal or maximal frequency domain spacing produces some moiré of only 0.39 of the fundamental frequency of the input screens, for most screens used in color applications (those with fundamentals of 141 cpi and above), even moiré with frequencies as low as 0.39 of the fundamental of the input screens are above the visually objectionable threshold. For example, 0.39 of 141 cpi is 55 cpi.

In the example of FIG. 10, the monotone or black and white example of FIG. 1-FIG. 9 was extended and applied repeatedly to a plurality of halftone screens associated with a plurality of color separations. Each rehalftone screen was selected based on an optimal or maximal separation from a fundamental of an associated input separation's halftone screen and a harmonic in line with that fundamental. In some instances, it may be desirable to select a rehalftone screen that is optimally or maximally spaced from other input screen frequency components.

Figure 11:
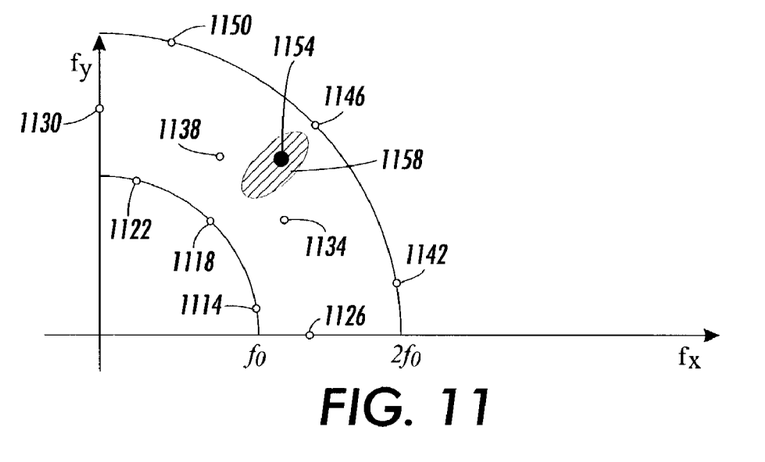
FIG. 11 is a qualitative moiré frequency analysis diagram showing frequency components of a set of input halftone screens in relation to a region from which an optimally spaced rehalftone screen can be selected.

For example, referring to FIG. 11, magenta 1114, black 1118 and cyan 1122 halftone screens associated with an input image each have a fundamental frequency $f_0$. The dot screens are oriented 30 degrees apart. The black screen 1118 is oriented at 45 degrees to a horizontal. The black screen has a first harmonic 1126 in the horizontal direction. Additionally, the black screen has a second harmonic 1130 in the vertical direction. (Again, here first and second do not refer to the order of the harmonics being discussed. First and second are used only to distinguish one harmonic or vector from another.) The cyan screen 1122 is oriented at 75 degrees to the horizontal and has a first harmonic 1134 at a frequency of $\sqrt{2}\ f_0$ and is oriented at 30 degrees to the horizontal. The magenta screen 1114 is oriented at 15 degrees to the horizontal and has first harmonic 1138 with a frequency of $\sqrt{2}\ f_0$ and is oriented at 60 degrees to the horizontal. The magenta screen 1114 has a second harmonic 1142 that has a frequency of $2\ f_0$ and is oriented at 15 degrees to the horizontal. The black input halftone screen 1118 has a third harmonic 1146 with a frequency of $2\ f_0$ that is oriented at 45 degrees to the horizontal. The cyan input halftone screen 1122 has a second harmonic 1150 with a frequency of $2\ f_0$ oriented at 75 degrees to the horizontal. Of course, each input halftone screen 1118, 1122, 1114 is associated with additional frequency components. However, it is assumed in this example that additional frequency components contain less energy than the components discussed here or they are out of the region of interest, and are therefore, of less interest than those illustrated in FIG. 11.

From an inspection of FIG. 11, it is clear that a point 1154 or region 1158 can be found that is optimally or maximally spaced from neighboring frequency components of the input screens. Such optimal regions or points can be found by minimizing a function of the distances between candidate points and the frequency components of interest. For example, searching for an optimal or maximally spaced rehalftone frequency can be expressed as a minimization of the function shown in Eq. 1

$$G = \sum_0^N (1/D(r(x, y) - \alpha_i f_i(x, y))), i = 0, 1, \ldots N \tag{1}$$

where r(x,y) represents a candidate rehalftone frequency in the frequency space, $f_1(x,y)$ are the input halftone frequency components of interest (e.g., 1118, 1138, 1146, 1134), $\alpha_1$ is a weighting factor corresponding to the strength or energy content of each of the frequency components $f_1(x,y)$. The function D( ) can be any measure of distance and is selected depending upon the application. For example, D can be written in the following forms:

$$D(r(x,y)-\alpha_1 f_1(x,y)))=|(r(x,y)-\alpha_1 f_1(x,y))|, \tag{2}$$

$$D(r(x,y)-\alpha_1 f_1(x,y)))=|(r(x,y)-\alpha_1 f_1(x,y))|^2, \tag{3}$$

or $$D(r(x,y)-\alpha_1 f_1(x,y)))=1/V(r(x,y)-\alpha_1 f_1(x,y)) \tag{4}$$

where V is a visual frequency response function. The function G can be minimized through, for example, numerical methods known in the art.

Figure 12:
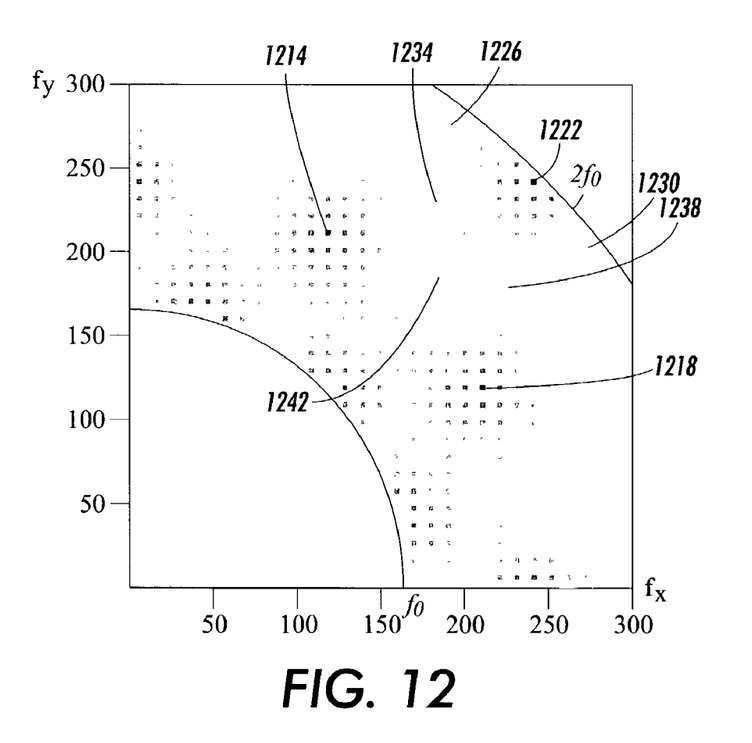
FIG. 12 is a quantitative moiré analysis diagram showing the results of a numerical search for regions from which optimally spaced rehalftone screens can be selected.

FIG. 12 represents the results of one such search. In the exemplary search, Eq. 3 was selected as the form of function D. All the frequency components were assumed to have the same magnitude. Therefore, all $\alpha_1$ were set equal to 1. The search was limited to a region between frequencies $f_0$ and $2\ f_0$. However, other frequency ranges could have been searched.

The darkness of points in FIG. 12 indicates the magnitude of function G (Eq. 1) at the associated point in frequency space. For example, dark regions 1214, 1218, 1222 correspond to harmonics 1138, 1134, 1146 and indicate that function G has relatively high values in these regions. Similarly, regions 1226, 1230, 1234, 1238, 1242 are relatively light in shading and indicate that function G has relatively low values in these regions. Regions 1226, 1230 are the lightest regions and are optimally or maximally spaced from the four frequency components of interest 1118, 1138, 1134, 1146. However, they 1226, 1230 occur at angles of about 60 and about 30 degrees, respectively. Selecting a rehalftone screen for a color separation at one of these angles implies the selection of a rehalftone screen for one of the other separations to be at 0 or 90 degrees. Such screens can sometimes be useful. For example, systems using offset lithography can usually take advantage of such rehalftone screens. However, those of skill in the art will understand that selecting such a rehalftone screen can be problematic due to the strong visual response at those angles and potential beating with other periodic phenomenon (e.g., motion quality banding) that occur in many printing processes such as laser and ink jet printing.

The region 1242 occurs at about 45 degrees. A rehalftone screen oriented at 45 degrees is easily achieved in currently available print engines. Additionally, the 45-degree angle coincides with the angle of the black input halftone screen 1118. For the foregoing reasons, region 1242 is determined to be a preferred region for selecting an optimally or maximally spaced rehalftone screen from.

Figure 2:
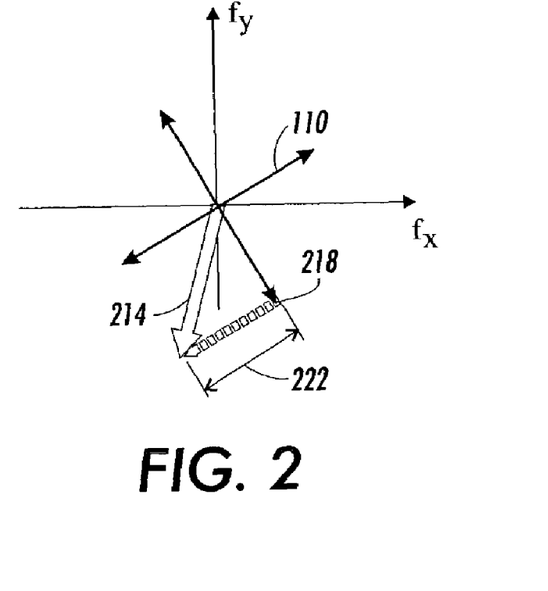
FIG. 2 is a qualitative moiré analysis vector diagram showing a beat between a first harmonic of the rehalftone screen of FIG. 1 and the fundamental frequency of the input screen of FIG. 1.
Figure 13:
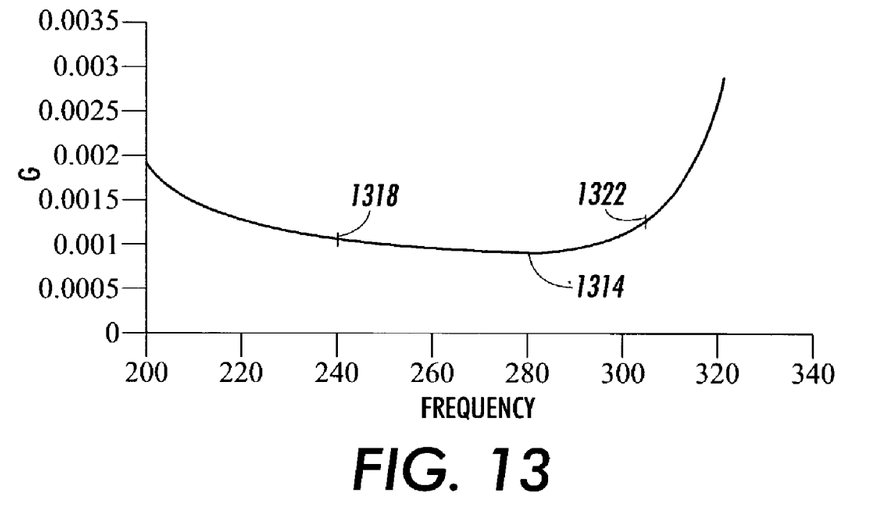
FIG. 13 is a graph showing a portion of the data displayed in FIG. 12.

Referring to FIG. 13, values of the function G are plotted from the example of FIG. 2 along the 45-degree orientation. In the example, $f_0$=170 cpi. As indicated in FIG. 13, the function G is at a local minimum 1314 at about 280 cpi (1.64 $f_0$). While this point 1314 may be optimal due to the minimum value of function G associated with it, other factors may come into play. Therefore, a range of rehalftone frequencies from about 1.4 $f_0$ 1318 to about 1.8 $f_0$ 1322 is considered optimal. For example, in this range, the value of function G varies very little from the minimum value at point 1314. Points where the value of function G varies little from the value at a local minimum point are considered to be near the local minimum. Similar ranges of optimal halftone frequencies occur between other sets of frequency components. For example, a range of optimal rehalftone frequencies can be found from about 2.4 $f_0$ to about 2.8 $f_0$, between harmonic components at 2 $f_0$ to 3 $f_0$.

As mentioned above, other frequency ranges can be searched in order to find optimal or maximally spaced rehalftone frequencies for minimum G function values. For example, due to operational constraints or characteristics of a particular print engine, there may be a preferred range of rehalftone frequencies that give optimal print engine performance. Searches can be limited to such optimal ranges by modifying Eq. 1 as shown in Eq. 5.

$$G = d(r(x, y) - f_{optimal}(x, y)) \sum_0^N (1/D(r(x, y) - \alpha_i f_i(x, y))), \tag{5}$$

$$i = 0, 1, \ldots N$$

In Eq. 5, $f_{optimal}(x,y)$ describes a range of desirable halftone frequencies. The function d is a function of the distance between a rehalftone frequency to a desired halftone frequency. For example, the function d can be written as:

$$d=1 \text{ if } |(r(x,y)-f_{optimal}(x,y))|<=C \quad (6)$$

$$d=|(r(x,y)-f_{optimal}(x,y))|^2 \text{ if } |(r(x,y)-f_{optimal}(x,y))|>C$$

where C is a constant that defines the desired frequency range.

Figure 14:
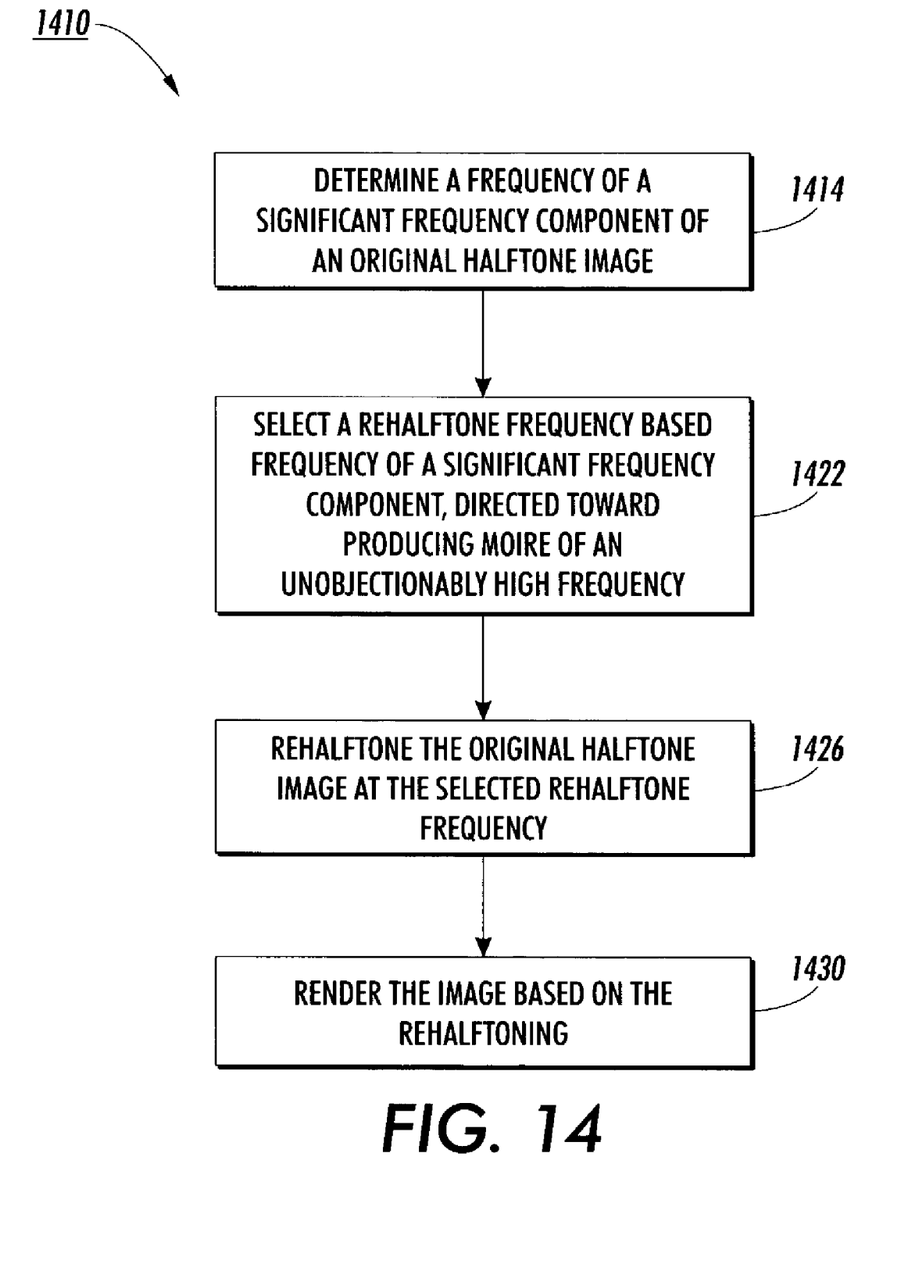
FIG. 14 is a flow diagram outlining a method of rendering an image based on an original halftone image.

Referring to FIG. 14, in summary, a method 1410 of rendering an image based on an original halftone image includes determining 1414 a frequency of a significant frequency component of the original halftone image, selecting 1422 a rehalftone frequency, based on the frequency of a significant frequency component, the selection being directed toward producing moiré of unobjectionably high frequency, rehalftoning 1426 the original halftone image at the selected rehalftone frequency, and rendering 1430 the image based on the rehalftoning.

Determining 1414 the frequency of a significant frequency component of the original halftone image can include receiving frequency information from an imaging system operator. Alternatively, frequency information regarding the original halftone image can be determined automatically. For example, image segmentation and classification algorithms can be used to determine significant halftone frequency components of an original or input halftone image.

Selecting 1422 a rehalftone frequency, based on the frequency of a significant frequency component, directed toward producing moiré of unobjectionably high frequency can include selecting a rehalftone frequency maximally or optimally spaced from significant frequency components of the halftone screen of the original halftone image. For example, a selected rehalftone frequency may be a frequency located halfway between a fundamental frequency of the original halftone screen and a harmonic of the original halftone screen. For instance, in the case of a monotone or black and white image, a selected and preferable rehalftone frequency is 1.5× the fundamental frequency of the input halftone screen. In the case of black and white images, selecting a rehalftone screen fundamental of 1.5× the fundamental frequency of the input halftone screen places the rehalftone screen fundamental halfway between the fundamental frequency of the input screen and a harmonic located at 2× the fundamental frequency of the input halftone screen. As explained in reference to FIG. 11-FIG. 13, in the case of color images selecting 1422 a rehalftone frequency, based on the frequency of a significant frequency component directed toward producing moiré of unobjectionably high frequency, can include selecting a rehalftone screen at a frequency and angle that optimally or maximally spaces the screen from a plurality of frequency components of the input halftone screen. In some instances, an optimally-spaced rehalftone frequency is not maximally spaced from frequency components of the input halftone screen, but rather, spaced far enough from the frequency components of the input halftone screen to only produce moiré at or above the target lower moiré frequency limit. Other factors, such as for example, physical constraints of a particular print engine, may influence the definition of an optimal spacing.

Rehalftoning 1426 the original halftone image at the selected rehalftone frequency includes using a rehalftone screen of the selected rehalftone frequency to rehalftone the original halftone image.

Rendering 1430 the image based on the rehalftoning can include using a xerographic, lithographic, ink jet or other print engine to print the image.

Figure 15:
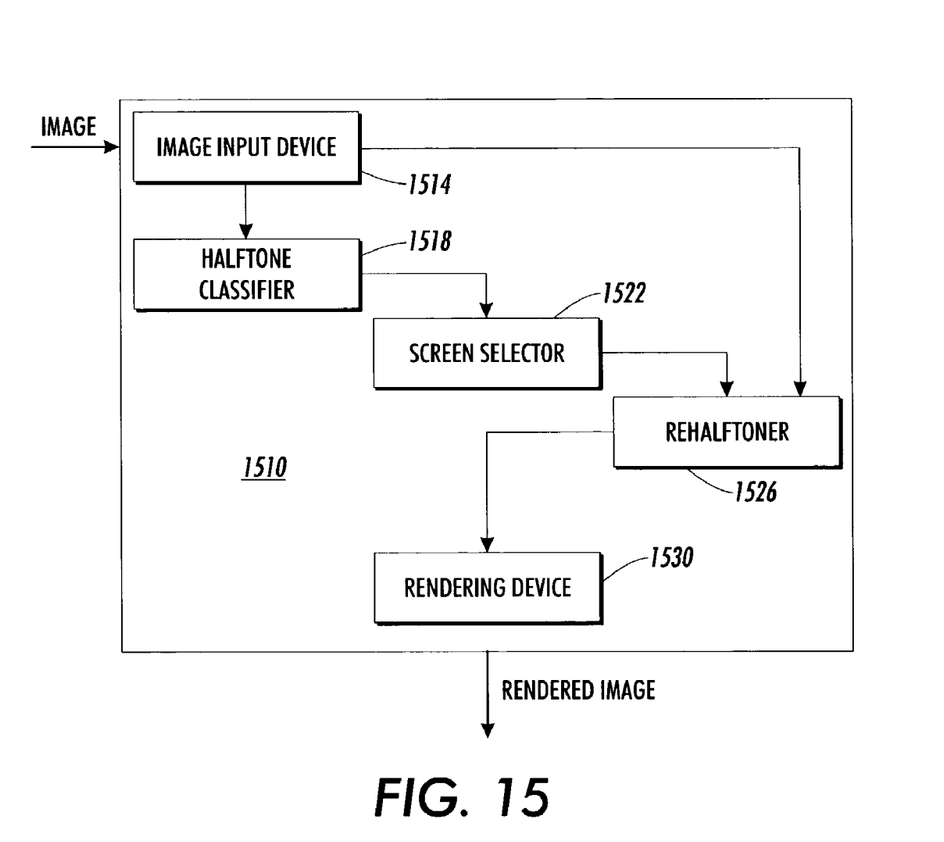
FIG. 15 is a block diagram of a system operative to perform the method of FIG. 11.

Referring to FIG. 15, a system 1510 operative to render an image based on an original halftone image includes an image input device 1514, a halftone classifier 1518, a screen selector 1522, a rehalftoner 1526, and a rendering device 1530.

The image input device 1514 can include any means for receiving an image. For example, the image input device 1514 can comprise a computer network connection, a rotating media such as a floppy disk, computer hard drive or CD ROM, or the image input device 1514 can be an image scanner or camera.

The image input device 1514 makes image information available to the halftone classifier 1518 and the rehalftoner 1526.

The halftone classifier determines characteristics of the original halftone screen of the input image. For example, the halftone classifier 1518 segments and classifies the image or portions of the input image in regard to one or more halftone screens used to render the image. The input halftone screen classifications include, for example, input halftone screen frequency information. Alternatively, the halftone classifier queries a system operator through an operator interface. The system operator enters information regarding one or more significant frequency components of the original halftone image. In yet a further alternative, the halftone classifier extracts halftone screen information that accompanies the original image in the form of tags or the like accompanying, for example multi-level halftoned images. The input halftone screen frequency information is passed to the screen selector 1522.

The screen selector selects a rehalftone screen that will produce the highest possible moiré frequencies. Here the highest possible moiré frequencies are the highest moiré frequencies that can be achieved with a particular print engine.

For example, a rehalftone screen is selected that has a rehalftone screen frequency that is as far as possible from significant frequency components of original input halftone screens. For instance, a rehalftone frequency is selected that is halfway between a fundamental frequency and a harmonic frequency of the input halftone screen. As illustrated in FIG. 1-FIG. 9, such a rehalftone screen may have a fundamental frequency of 1.5× the fundamental frequency of the input screen. Alternatively, as explained in reference to FIG. 11-FIG. 13, a rehalftone screen is selected that is as far as possible or practical from significant frequency components of the input halftone screen. For example, a rehalftone screen is selected having a fundamental frequency that is as close as possible to a point in frequency space that is maximally distant from frequency components of interest. The selected rehalftone screen is passed to the rehalftoner 1526.

The rehalftoner 1526 uses contone values from the image information it receives from the image input device 1514 and the selected rehalftone screen to generate a binary or halftone version of the input image. The binary or halftoned version of the image is passed to the rendering device 1530. The rendering device can be, for example, a xerographic, ionographic, lithographic, ink jet or other rendering device. Xerographic print engines are known to include a fuser, a developer and an imaging member. The rendering device 1530 renders the rehalftoned image. For example, the rehalftoned image is produced on a printed page.

The invention has been described with reference to particular embodiments. Modifications and alterations will occur to others upon reading and understanding the specification. For example, other measures of distance can be used and other optimization equations can be minimized. The functions of the functional blocks of the apparatus can be rearranged and implemented in various other configurations. It is intended that all such modifications and alterations are included insofar as they come within the scope of the appended claims or the equivalents thereof.

What is claimed is:

1. A method of rendering an image based on an original halftone image, the method comprising:
   determining a frequency of a significant frequency component of the original halftone image;
   selecting a rehalftone frequency, based on the frequency of the significant frequency component, the selection being directed toward producing moiré of unobjectionably high frequency;
   rehalftoning the original halftone image at the selected rehalftone frequency; and,
   rendering the image based on the rehalftoning.

2. The method of rendering an image of claim 1 wherein determining a halftone frequency comprises:
   segmenting the image; and,
   classifying the image in regard to at least one halftone screen frequency component, based on the segmentation.

3. The method of rendering an image of claim 1 wherein selecting the rehalftone frequency comprises:
   searching frequency space by minimizing a function of distances between candidate rehalftone frequency points and frequency components of interest; and,
   selecting a rehalftone frequency from within a region of frequency space near a local minimum of the function of distances.

4. The method of rendering an image of claim 3 wherein selecting a rehalftone frequency from within a region of frequency space near a local minimum further comprises:
   selecting a rehalftone frequency that is achievable with an associated rendering device.

5. The method of rendering an image of claim 3 wherein selecting a rehalftone frequency from within a region of frequency space near a local minimum further comprises:
   selecting a rehalftone frequency that yields moiré having a frequency above 50 cpi.

6. The method of rendering an image of claim 1 wherein selecting the rehalftone frequency comprises:
   selecting the rehalftone frequency to be in a range of about 1.4 to about 1.8 times the a fundamental halftone frequency associated with the original halftone image.

7. The method of rendering an image of claim 1 wherein selecting the rehalftone frequency comprises:
   selecting the rehalftone frequency to be one of 1.5, 1.64 and 2.5 times the a fundamental halftone frequency associated with the original halftone image.

8. The method of rendering an image of claim 1 wherein selecting the rehalftone frequency comprises:
   selecting the rehalftone frequency to be in a range of about 2.4 to about 2.8 times the a fundamental halftone frequency associated with the original halftone image.

9. The method of rendering an image of claim 1 wherein rendering the image comprises using a xerographic print engine to print the image.

10. The method of rendering an image of claim 1 wherein rendering the image comprises using one of a lithographic print engine and an ink jet print engine to print the image.

11. A method of rendering an image based on an original halftone image, the method comprising:
    determining a halftone frequency of the original halftone image;
    selecting a rehalftone frequency to be 1.4 to 1.8 or 2.4 to 2.8 times the determined halftone frequency of the original halftone image;
    rehalftoning the original halftone image at the selected rehalftone frequency; and,
    rendering the image based on the rehalftoning, thereby ensuring that no visually objectionable moiré occur.

12. The method of rendering an image of claim 11 wherein determining a halftone frequency comprises:
    segmenting the image; and,
    classifying the image in regard to at least one halftone screen frequency component, based on the segmentation.

13. The method of rendering an image of claim 11 wherein selecting a rehalftone frequency comprises:
    selecting a rehalftone frequency that yields moiré having a frequency above 50 cpi.

14. The method of rendering an image of claim 11 wherein rendering the image comprises using a xerographic print engine to print the image.

15. The method of rendering an image of claim 11 wherein rendering the image comprises using one of a lithographic print engine and an ink jet print engine to print the image.

16. A system operative to render an image based on an original halftone image, the system comprising:
    a halftone frequency classifier operative to determine a significant frequency component of the original halftone image;
    a screen selector operative to select a rehalftone screen having a rehalftone frequency based on the significant frequency component, the selection being directed toward producing moiré of unobjectionably high frequency;
    a rehalftoner operative to rehalftone an image, based on the original halftone image, with the selected rehalftone screen; and,
    a rendering device operative to render the image.

17. The system operative to render an image of claim 16 wherein the halftone frequency classifier comprises:
    an image segmenter; and,
    a halftone frequency classifier.

18. The system operative to render an image of claim 17 wherein the halftone frequency classifier comprises:
    an operator interface operative to receive information regarding a significant frequency component of the original halftone image from a system operator.

19. The system operative to render an image of claim 16 wherein the halftone frequency classifier is operative to extract halftone frequency information from tag information associated with the image.

20. The system operative to render an image of claim 16 wherein screen selector is operative to select a rehalftone screen having a rehalftone frequency of between approximately 1.4 to 1.8 or of between approximately 2.4 to 2.8 times the frequency of the significant frequency component of the original image.

21. The system operative to render an image of claim 16 wherein the screen selector is operative to select a rehalftone screen having a rehalftone frequency of approximately one of 1.5, 1.64 and 2.5 times the original halftone frequency.

22. The system operative to render an image of claim 16 wherein the screen selector is operative search frequency space by minimizing a function of distances between candidate rehalftone frequency points and frequency components of interest, and select a rehalftone frequency from within a region of frequency space near a local minimum of the function of distances.

23. The system operative to render an image of claim 16 wherein the rendering device comprises a xerographic print engine.

24. The system operative to render an image of claim 16 wherein the rendering device comprises one of a lithographic print engine and an ink jet print engine.

25. The system operative to render an image of claim 16 wherein the screen selector is operative to select a rehalftone screen that yields moiré having a frequency above 50 cpi.

* * * * *